No. 762,133. Patented June 7, 1904.

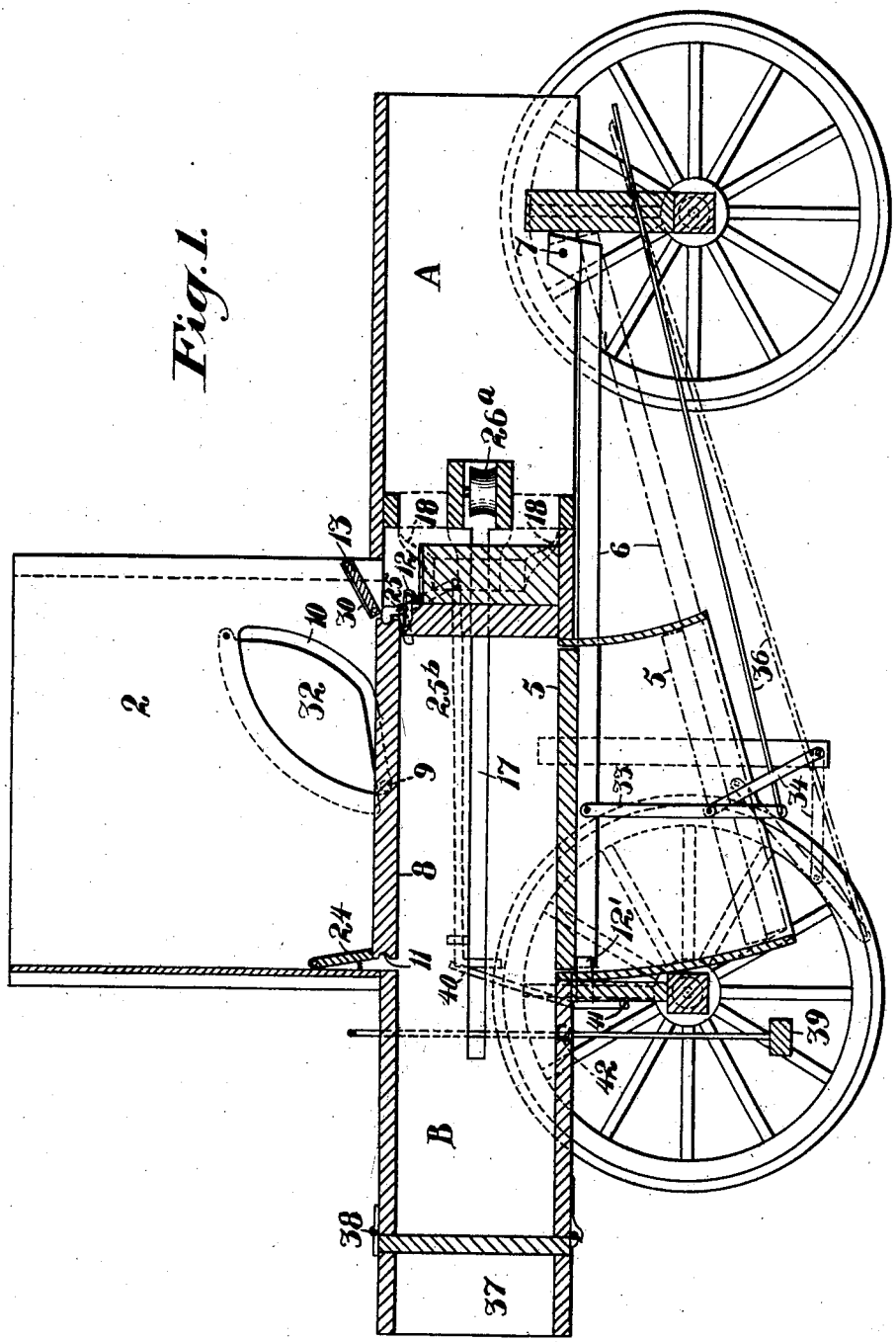

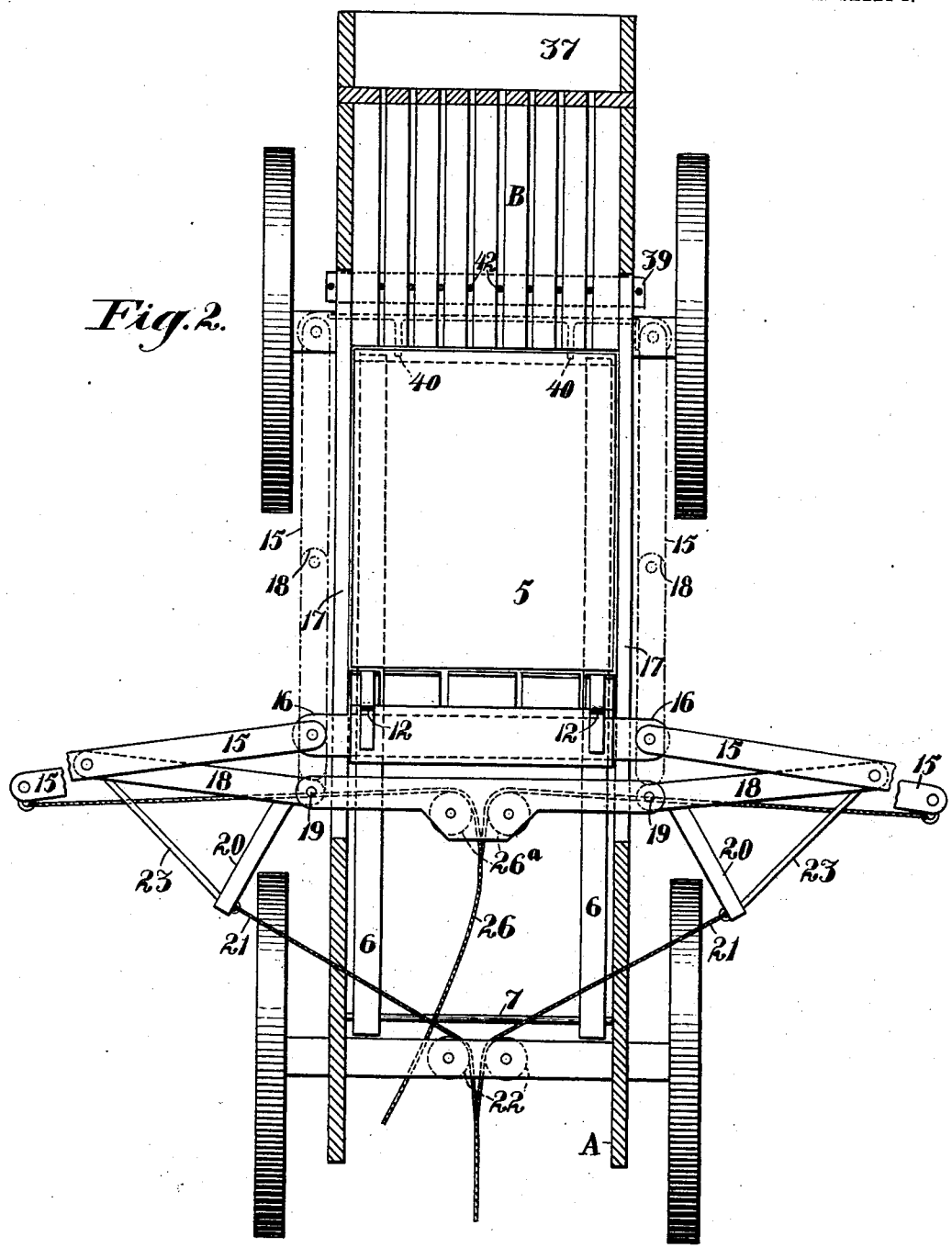

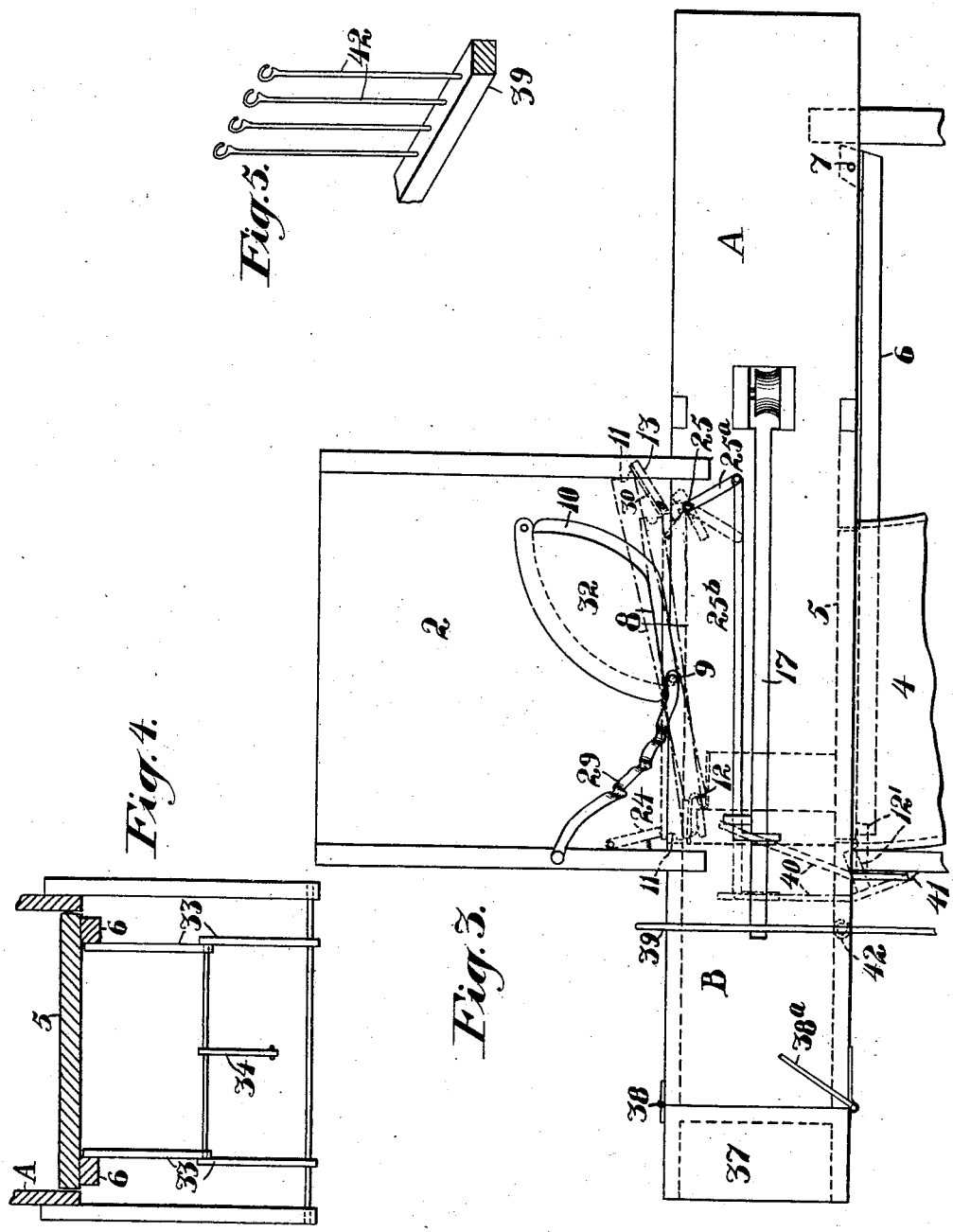

UNITED STATES PATENT OFFICE.

WALTER BULLARD, OF CHICO, CALIFORNIA.

BALING-PRESS.

SPECIFICATION forming part of Letters Patent No. 762,133, dated June 7, 1904.

Application filed January 22, 1904. Serial No. 190,151. (No model.)

*To all whom it may concern:*

Be it known that I, WALTER BULLARD, a citizen of the United States, residing at Chico, in the county of Butte and State of California, have invented new and useful Improvements in Baling-Presses, of which the following is a specification.

My invention relates to improvements in baling-presses.

It consists in an arrangement of a horizontally-disposed baling-chamber, a second chamber substantially in line therewith and having a vertically-movable bottom and operating connections, a feed-hopper located above said second chamber having an intermediate revoluble bottom adapted to receive the material to be baled in charges, and means by which it may be periodically inverted to discharge the load into the chamber below, means for operating and locking the said revoluble bottom, a horizontally-reciprocating follower adapted to compress the material into the baling-chamber, and means for putting on the binding-ties by which the bales are held in their compressed condition.

It also comprises details of construction, which will be more fully explained by reference to the accompanying drawings, in which—

Figure 1 is a central longitudinal section of my apparatus. Fig. 2 is a plan of same, partly in section. Fig. 3 is a side elevation having some parts removed. Fig. 4 is a rear view of levers that actuate the bottom of the chamber. Fig. 5 is a view of the hooks to carry tie-wires.

As shown in the drawings, A is a frame which may be stationary; but I have in the present case shown it mounted upon wheeled axles, so that it is easily transported from place to place.

B is the baling-chamber, which is located at one end of the frame A and which for the purposes of this description I will call the "rear" end, as being in the direction of the discharge.

In front of the baling-chamber is a feed-chamber 4, having a bottom 5, which is here shown as carried upon lever-arms 6, these arms being pivoted or fulcrumed near the front of the machine, as shown at 7, and this bottom is capable of being raised or depressed at the proper intervals, as will be hereinafter described.

2 is a feed-hopper or source of supply which is located above the feed-chamber, and this may be supplied with material to be baled either by mechanically-operated forks or feeders, or it may be supplied by hand from a table located upon the machine in front of the hopper and adapted to receive the material which is to be baled.

8 is a revoluble or reversible bottom for the hopper 2, and this bottom has centrally-disposed pivots 9 projecting and adapted to travel in openings 10 in the sides of the hopper. The transverse front and rear edges of this bottom 8 have grooves or channels made in them, as at 11, and these grooves or channels are adapted to be engaged by horns 12, which project from the front edge of the follower.

Across the lower front part of the hopper is a bridge-board 13, its ends extending into slots at each side, in which it can move forward and back a short distance. When the bottom of the hopper is in a horizontal position, its upper forward edge touches the back edge of the bridge-board, and when the forward end of the bottom is raised the bridge-board, being actuated by a spring, slides under it far enough to prevent it from again falling to the horizontal position. The follower is retracted by means of lever-arms 15, the inner ends of which are connected with outwardly-extending plates 16, fixed to the follower and adapted to travel in horizontal slots 17 in the sides of the frame A.

18 represents arms having their outer ends pivoted approximately at the center of the levers 15 and their inner ends turnable upon stationary pivots, as at 19.

20 represents other lever-arms, extending from the fulcrum-point of the arms 18 and forming bell-crank levers, to the outer ends of which are attached cords, as at 21. These cords lead over guide-rollers, as at 22, near the front of the machine, and the outer ends of the levers 20 18 being connected by rods, as at 23, it will be seen that a pull upon the cords 21 will act, through the levers 20 18, to draw them toward the front, and these acting upon the levers 15 will draw the follower out of the baling-chamber.

The operation of the device will be as follows: The bottom or door 8 lies substantially flat, and the rear end is held down by a spring-pressed hinged flap 24, the upper edge of which is hinged at the rear portion of the lower part of the hopper, as shown. The front end is held in place by a hook or hooks on the shaft 25, which extend across the machine contiguous to this end of the door or bottom. Secured to this shaft are also one or more studs or horns, which project obliquely backward, while the hooks project upward and backward, the horns being beneath the front end of the bottom 8, while the hooks engage catches in the front end of the bottom. One or both ends of this shaft 25 project through the side of the machine and is provided with a crank $25^a$ on the outside, which projects downward and engages the front end of a rod $25^b$. This rod extending along through suitable guides by the side of the feed-chamber bends down past the slot 17 in the path of the plates 16, which extend out from the ends of the follower. Material to be baled may then be filled in upon the top of this door or bottom. Pulling on the chain or rope 26 moves the follower backward below this feed door or bottom. The chain 26 passes between guide-rollers $26^a$, and the ends of the chain diverge and connect with the ends of the levers 15. The levers 18 serve as fulcrums about which levers 15 are moved. When the follower is near the extreme end of its backward stroke, the plates 16 come in contact with the bent end of the rod $25^b$, and thus pull on the crank $25^a$, which causes the shaft 25 to turn on its bearings. This disengages the hooks from the catches in the front end of the door or bottom and causes the horns or studs to press up against the door or bottom and raise its front end high enough so that the bridge-board 13 will slide under it. As the front end of the bottom is raised it turns upon its pivoted center, so that the back end is depressed and rests on the follower, with its grooved end in the path of the horns 12. When the follower starts on its return or forward stroke, it releases the rod $25^b$, thus allowing the shaft 25 (which is actuated by a spring) to resume its former position. When the horns of the follower 12 come in contact with the grooves 11 in the bottom 8, the bottom slides forward with the follower, its front corners resting upon suitable tracks 30 near the ends of the bridge-board 13. Straps or chains 29 have one end fixed to the hopper and the other to the pivot-pins, which project from the bottom 8 through the sides of the hopper, and when these become taut they lift the front end of the bottom from the bridge-board, and as the follower brings the back end of the bottom forward it is brought to an upright position, standing on the follower and forming the front side of the hopper, thus dumping the charge from the bottom 8 into the feed-chamber below.

The guide straps or chains 29 may be made short enough so that they will draw the bottom past a perpendicular position, so that it will drop over automatically or its top may be pushed over by hand, and it will then fall to its former position, the spring-pressed flap 24 yielding to let it pass and the hooks on the shaft 25 engaging the opposite end, which has now become the front end.

In order to prevent an escape of the material through the openings in which the pivot-pins of the bottom 8 work, I have shown plates 32 pivoted at the upper angle and having the lower edge curved to correspond with the curve of the opening 10, so as to form comparatively narrow channels that will not permit the escape of material while it is being placed in the hopper, and when the bottom 8 is moved so as to turn and reverse, as described, its central pins being held or guided by the flexible connections 29 will follow the curvature of the channel formed between the edge of the plate 32 and the edge 10 of the opening in the side of the hopper.

When the material has been discharged into the lower chamber, as previously described, the plates 32 will be pushed out of the way by the pins as the door 8 falls down to its original position and allow the pivot-pins to move through the curvature of the upper side of the opening 10, and thus return to a point of rest in the bottom of the notch or groove 10.

The bottom 5 of the chamber 4 is actuated by levers 33 34, connected together, as plainly thown in the drawings, and acting similarly to a toggle-lever. By this construction of ehe levers I am able to apply a positive and squal lifting power to both sides of the movable bottom, and thus insure the accurate action of the bottom and its latches.

A rod 36 connects with the end of the lever 34, and by pulling upon this rod the levers act to raise the bottom 5 to the level of the bottom of the baling-chamber, where it is engaged by the hooks or latches, which hold it in its raised position. This raising of the bottom 5 presses the loose charge lying between this bottom and the bottom 8 and prepares it for the action of the follower, which being moved forward forces the charge into the baling-chamber, and as the follower moves back its plate 16 contacts with the arms 40 of a rock-shaft 41, upon which the latches are carried, and disengages these latches and allows the bottom 5 to again drop into position to receive the next charge from the hopper.

The baling-chamber has a door or back, as at 37, which is carried by hinges 38 at the top, and at the bottom has latches by which it is normally held in a closed position. These latches are disengaged by movement of a lever, as at 38ª, to allow this back portion to be opened when a bale is completed and ready to be discharged.

A sliding yoke 39 is movable vertically in guides upon the outer sides of the press, and this yoke extends across the bottom of the baling-chamber and has hook-rods 42 attached to it and projecting up through the open spaces between the bars which form the baling-chamber. These hook-rods are raised by pulling upward upon the yoke until the hooks are above the top of the baling-chamber, and the tie-wires are attached and pulled down by the downward movement of the yoke and the hooks. As the follower is reciprocated and successive charges of material are forced into the baling-chamber the material pushes the wires back until the bale is completed, when the wires will encircle the bale from the top over the back and below the bottom and then by means of the hooks the free ends may be pulled up through the channels in the follower in the front of the bale, thus bringing the wires into position for the final tie and securing of the bale in its compressed condition before the rear door has been opened.

Having thus described my invention, what I claim, and desire to secure by Letters Patent, is—

1. The combination in a baling-press of a horizontally-disposed baling-chamber, a follower and mechanism by which it may be reciprocated into and out of the chamber, a feed-chamber located in line with the baling-chamber having a bottom depressible to receive a charge and adapted to rise to partially compress the charge before the latter is forced into the baling-chamber by the follower, means for raising said bottom, a feed-hopper located above said chamber and an intermediate reversible bottom therefor, a spring-pressed bridge-board located at the front of the reversible bottom, and means by which said bottom is raised from a horizontal to a reversible position to allow the charge of material to fall into the lower chamber.

2. A baling-press consisting of a horizontally-disposed baling-chamber and reciprocating follower, means for reciprocating the follower, a feed-chamber having a rising-and-falling bottom located in front of the baling-chamber, means for raising and lowering said bottom, a feed-hopper above said feed-chamber, a bottom for said feed-hopper having centrally-located pivot-pins passing through the sides of the chamber, flexible exterior connections between said pivot-pins and a fixed point, and hinged swinging plates covering the side openings of the hopper and forming channels within which the pivot-pins are movable in unison with the movements of the hopper-bottom.

3. A baling-press consisting of a horizontally-disposed baling-chamber and reciprocating follower, means for reciprocating the follower, a feed-chamber having a rising-and-falling bottom located in front of the baling-chamber, means for raising and lowering said bottom, a hopper located above said feed-chamber, a bottom to said hopper having centrally-located pivot-pins projecting through openings in the sides of the hopper, flexible connections between said pins and a fixed point, a crank-arm by which the forward end of the hopper-bottom is lifted and lugs or projections upon the follower adapted to engage the rear end of said hopper-bottom.

4. A baling-press having a horizontally-disposed baling-chamber and reciprocating follower, means for reciprocating the follower, a feed-chamber with a vertically-moving bottom located in front of the baling-chamber, means for raising and lowering said bottom, a hopper located above said feeding-chamber and having a bottom with centrally-fixed pivot-pins, openings in the side of the hopper through which said pins project, flexible connections between said pins and fixed points upon the sides of the hopper, swinging plates adapted to cover the openings in the hopper sides, and to form slots or channels within which the pins are movable, horns upon the follower engaging the rear end of the hopper-bottom, a shaft with crank-arms adapted to raise the front end of the hopper-bottom so that the return movement of the follower acts to raise said bottom into a vertical position and to discharge its load into the feed-chamber.

5. A baling-press consisting of a horizontally-disposed baling-chamber, a reciprocating follower, means for reciprocating the follower, a feed-chamber with rising-and-falling bottom located in front of the baling-chamber, means for raising and lowering said bottom, a hopper located above the feed-chamber, a bottom for said hopper having centrally-located pivot-arms projecting through openings in the sides of the hopper, exterior flexible connections between said pins and the fixed point, and a crank-shaft adapted to raise the front end of said bottom, a spring-pressed bridge movable at an incline from the front edge of the hopper-bottom and having guides or tracks across it upon which said bottom is slidable preparatory to being reversed, a projecting horn upon the follower adapted to engage the rear end of the hopper-bottom and acting in conjunction with the pivot-pins and connections, to raise the bottom into a vertical position to discharge its load into the feed-chamber, and to subsequently invert it and restore it to its normal horizontal position.

6. A baling-press consisting of a horizontally-disposed baling-chamber and reciprocating follower, means for reciprocating the follower, a feed-chamber with rising-and-falling bottom located in front of the baling-chamber, means for raising and lowering said bottom, a hopper located above the feed-chamber having a bottom upon which the material to be baled is placed, means connected with the follower whereby the front end of the bottom is first raised, a spring-pressed bridge-board contiguous to the front edge of the hopper-bottom and having tracks over which the front of the hopper-bottom is slidable as it commences to rise, lever-arms connected with lugs projecting from the follower through slots in the frame, ropes or chains connecting with said levers whereby the follower may be reciprocated into and out of the baling-chamber.

7. A baling-press consisting of a horizontally-disposed baling-chamber, a feed-chamber located in front thereof, a hopper located above the feed-chamber having a reversible bottom adapted to receive charges of material to be baled, and means as described by which it is inverted to discharge its load into the feed-chamber, a vertically-movable bottom to said feed-chamber, lever-arms and a rod or chain connection therewith whereby said bottom is raised after the hopper-bottom has been inverted to partially compress the charge between the two said bottoms, a follower and means by which it is reciprocated to compress successive charges into the baling-chamber.

8. A baling-press consisting of a horizontally-disposed baling-chamber, a feed-chamber with rising-and-falling bottom located in front of the baling-chamber, means for raising and lowering said bottom, a hopper located above the feed-chamber having a reversible bottom adapted to receive charges of material to be baled and means by which said bottom is inverted to discharge its load into the feed-chamber, a follower having lugs projecting through slots in the sides of the frame, levers having one end pivoted to said lugs, ropes or chains connected with the opposite ends of said levers passing over guide-pulleys and adapted to pull the levers toward the sides of the press by the application of power, bell-crank levers having the angles fulcrumed at the sides of the frame, and arms connected centrally with the first-named levers, ropes or chains connected with the other arms of the bell-crank levers, guide-pulleys over which they pass whereby a reverse movement of the follower is effected.

9. A baling-press consisting of a horizontally-disposed baling-chamber and reciprocating follower, means for reciprocating the follower, a feed-chamber, hopper and movable bottoms for said chamber and hopper whereby successive charges of material are placed in the feed-chamber and afterward advanced by the follower into the baling-chamber, means for operating said bottoms, a vertically-reciprocating yoke inclosing the baling-chamber, means for reciprocating the yoke, rods connected with the lower bar of said yoke extending through the longitudinal top and bottom slots of the baling-chamber and having hooks upon the upper ends, said hooks adapted to engage with the tie-wires and to pull said wires down through the chamber when the yoke is depressed whereby the movement of the material into the baling-chamber causes said tie-wires to inclose and clasp the material and by the upward movement of the yoke, said wires are drawn into position to be secured after the bale is completed.

10. A baling-press consisting of a horizontally-disposed baling-chamber, a reciprocating follower, means for reciprocating the follower, a feed-chamber and a hopper located above said feed-chamber, bottoms movable in said chamber and hopper and means for operating the bottoms whereby successive charges of material are first introduced into the hopper, then delivered into the feed-chamber and finally advanced and compressed in the baling-chamber by the movement of the follower, a cap or closing outer end for the baling-chamber, said cap being hinged at the top, hooks or catches attached to the lower part of said cap and means adapted to engage said hooks when the cap is closed, and means to disengage the hooks to allow the end of the chamber to be opened for the discharge of completed bales.

11. A baling-press consisting of a horizontally-disposed baling-chamber, a follower reciprocable with relation thereto, means for reciprocating the follower, a feed-chamber located in front of the baling-chamber having a rising-and-falling bottom, and mechanism by which it is actuated, a hopper located above the feed-chamber, a centrally-pivoted turnable bottom for said hopper, a turnable crank-shaft by which the front end of the hopper-bottom is elevated, a spring-pressed movable bridge-board located contiguous to the front edge of the hopper-bottom, a spring-pressed flap adapted to engage the rear edge of the bottom whereby said bottom is retained in position while a charge is being pressed, connections between the follower and the turnable crank-shaft whereby the bottom is first tilted upwardly, guides upon the bridge-board upon which the front end of said bottom is slidable, and a lip or projection upon the follower engaging the rear edge of the hopper-bottom whereby the return movement of the follower advances and turns the hopper-bottom to discharge its load into the feed-chamber below, pins projecting from the sides of the hopper-bottom through slots in the side of the hopper, flexible connections between pins and fixed exterior points acting in unison with the follower to reverse the hopper-bottom and pivoted swinging plates adapted to cover the openings in the hopper sides, said plates being movable to allow the movement of the guide-pins of the hopper-bottom.

12. A baling-press consisting of a horizontal baling-chamber and reciprocating follower, means for reciprocating the follower, a feed-chamber, a superposed hopper with a pivoted reversible bottom, a shaft journaled beneath the front end of the hopper, having hooks by which the bottom is locked while charging, studs or horns by which to lift this end of the bottom, and means for operating the studs or horns.

13. A baling-press consisting of a horizontal baling-chamber and reciprocating follower, means for reciprocating the follower, a feed-chamber in front of the baling-chamber, and a superposed hopper, a pivoted turnable bottom for said hopper, hooks to lock into the front edge of the bottom, horns by which said front is lifted when the hooks are disengaged and a spring-pressed bridge-board adapted to slide beneath the bottom when its front has been raised, and means for operating said horns.

14. A baling-press consisting of a horizontal baling-chamber and reciprocating follower, means for reciprocating the follower, a feed-chamber with vertically-movable bottom, located in front of the baling-chamber, means for operating said bottom, a superposed hopper, a pivoted turnable bottom for the hopper, a spring-pressed bridge-board slidable with relation to the front edge of the bottom, a shaft with hooks to engage and lock the front of the bottom and horns or lifters to raise the front of the bottom, following the disengagement of the hooks, crank-arms on the shaft, and hook-rods adapted to be engaged by the follower-arms when the latter move backward, whereby the shaft is oscillated.

15. A baling-press consisting of a horizontal baling-chamber and reciprocating follower, means for reciprocating the follower, a feed-chamber and superposed hopper located in front of the baling-chamber, a pivoted turnable bottom for the hopper, a transverse shaft with locking hooks and lifters for the front edge of said bottom, a crank-arm and connections actuated by the rearward movement of the follower to disengage the hooks and raise the lifters, and a spring-pressed bridge-board adapted to slide beneath the front of the hopper-bottom when the latter is lifted.

16. A baling-press consisting of a horizontal baling-chamber and reciprocating follower, means for reciprocating the follower, a feed-chamber and superposed hopper located in front of the baling-chamber, a vertically-movable bottom for the feed-chamber, toggle-levers, one member of which has its upturned ends connected with opposite sides of the feed-chamber bottom, and the other member having arms hinged to the first member and having pivots at its ends turnable in fixed supports, and means for operating the toggle-levers.

In testimony whereof I have hereunto set my hand in presence of two subscribing witnesses.

WALTER BULLARD.

Witnesses:
  H. W. HEATH,
  THOS. N. CREW.